(12) United States Patent
Song

(10) Patent No.: US 10,634,060 B2
(45) Date of Patent: Apr. 28, 2020

(54) ENGINE DOOR WITH BURST SEAL

(71) Applicant: MRA SYSTEMS LLC, Baltimore, MD (US)

(72) Inventor: Qiming Song, Xuhui District (CN)

(73) Assignee: MRA SYSTEMS, LLC, Baltimore, MD (US)

( * ) Notice: Subject to any disclaimer, the term of this patent is extended or adjusted under 35 U.S.C. 154(b) by 335 days.

(21) Appl. No.: 15/356,593

(22) Filed: Nov. 20, 2016

(65) Prior Publication Data
US 2018/0142624 A1 May 24, 2018

(51) Int. Cl.
| | | |
|---|---|---|
| *F02C 7/28* | (2006.01) | |
| *B64D 29/06* | (2006.01) | |
| *B64D 29/08* | (2006.01) | |
| *F01D 25/24* | (2006.01) | |
| *F01D 25/00* | (2006.01) | |
| *F02C 7/00* | (2006.01) | |
| *F01D 9/02* | (2006.01) | |
| *F02C 3/04* | (2006.01) | |

(52) U.S. Cl.
CPC .............. *F02C 7/28* (2013.01); *B64D 29/06* (2013.01); *B64D 29/08* (2013.01); *F01D 9/023* (2013.01); *F01D 25/00* (2013.01); *F01D 25/24* (2013.01); *F02C 3/04* (2013.01); *F02C 7/00* (2013.01); *F05D 2220/32* (2013.01); *F05D 2240/55* (2013.01); *F05D 2260/606* (2013.01)

(58) Field of Classification Search
None
See application file for complete search history.

(56) References Cited

U.S. PATENT DOCUMENTS

| | | | |
|---|---|---|---|
| 3,571,977 A * | 3/1971 | Abeel | B64C 1/1446 |
| | | | 49/379 |
| 3,722,734 A | 3/1973 | Raidl, Jr. | |
| 4,232,513 A | 11/1980 | Pearson et al. | |
| 4,655,070 A | 4/1987 | Clift | |
| 4,825,644 A | 5/1989 | Bubello et al. | |
| 5,765,883 A * | 6/1998 | Dessenberger | B64D 29/06 |
| | | | 292/240 |
| 9,315,276 B2 | 4/2016 | Alazraki | |
| 2004/0238687 A1 | 12/2004 | Jones et al. | |
| 2005/0150204 A1* | 7/2005 | Stretton | F02C 7/047 |
| | | | 60/39.83 |
| 2011/0240137 A1 | 10/2011 | Vauchel | |
| 2012/0255274 A1* | 10/2012 | Hummel | B64D 15/04 |
| | | | 60/39.093 |
| 2015/0098810 A1* | 4/2015 | Soria | F01D 25/28 |
| | | | 415/200 |
| 2016/0145918 A1 | 5/2016 | Liang et al. | |

(Continued)

OTHER PUBLICATIONS

International Search Report and Written Opinion issued in connection with corresponding PCT Application No. PCT/US2017/059159 dated Feb. 7, 2018.

*Primary Examiner* — Todd E Manahan
*Assistant Examiner* — Rodolphe Andre Chabreyrie
(74) *Attorney, Agent, or Firm* — Xsensus LLP

(57) ABSTRACT

A method and apparatus for a gas turbine engine including a core engine a nacelle surrounding at least a portion of the core engine and defining an interior with an opening. An access door for the opening to provide selective access to the opening where the access door provides pressure relief for the interior.

20 Claims, 5 Drawing Sheets

(56) References Cited

U.S. PATENT DOCUMENTS

2016/0146363 A1* 5/2016 Goggin .................. F16K 17/16
137/68.19
2016/0169012 A1* 6/2016 DaCunha ............... C25D 5/022
416/241 R
2018/0051819 A1* 2/2018 Pittel ....................... F16K 17/40

* cited by examiner

ENGINE DOOR WITH BURST SEAL

BACKGROUND OF THE INVENTION

Contemporary aircraft can include engines with pressure relief systems. For example, a sudden pressure rise can occur in a nacelle compartment of the engine and this can cause stresses in the compartment which can result in failure of nacelle components or unacceptable deformation of the nacelle. Accordingly, the engine typically features some component capable of enabling pressure relief to prevent damage to nacelle components.

BRIEF DESCRIPTION OF THE INVENTION

In one aspect, a gas turbine engine including a core engine, a nacelle surrounding at least a portion of the core engine and defining an interior with an opening. Further including an access door for the opening and movably mounted to a portion of the nacelle for movement between an opened position and a closed position to provide selective access to the opening, and a set of burst seals provided on the door, wherein when pressure within the interior reaches a predetermined value the set of burst seals ruptures.

In another aspect, a nacelle for a turbine engine including co-axial inner and outer housings defining an interior therebetween, an access door pivotally mounted to the outer housing providing access to the interior, a set of burst seals provided on a surface of the access door, wherein when pressure within the interior reaches a predetermined value the set of burst seals ruptures.

In a further aspect, a method of relieving pressure in an interior of a nacelle having an access door to the interior, the method comprising rupturing a set of burst seals in the door without opening the door when the pressure in the interior reaches a predetermined level.

DESCRIPTION OF EMBODIMENTS OF THE INVENTION

Embodiments disclosed herein relate to an access door, for example gaining access to an oil tank of a turbine engine. The exemplary access door can be located on an outer nacelle surface an include rupture seals. Further, the term "rupture seal" as used herein can be used interchangeably with the by way of non-limiting example rupture disc, pressure safety disc, burst disc, bursting disc, and burst diaphragm. As used herein, the rupture seals are applicable to various types of applications such as, but not limited to, turbojets, turbo fans, turbo propulsion engines, aircraft engines, gas turbines, steam turbines, wind turbines, and water turbines.

Figure 1:
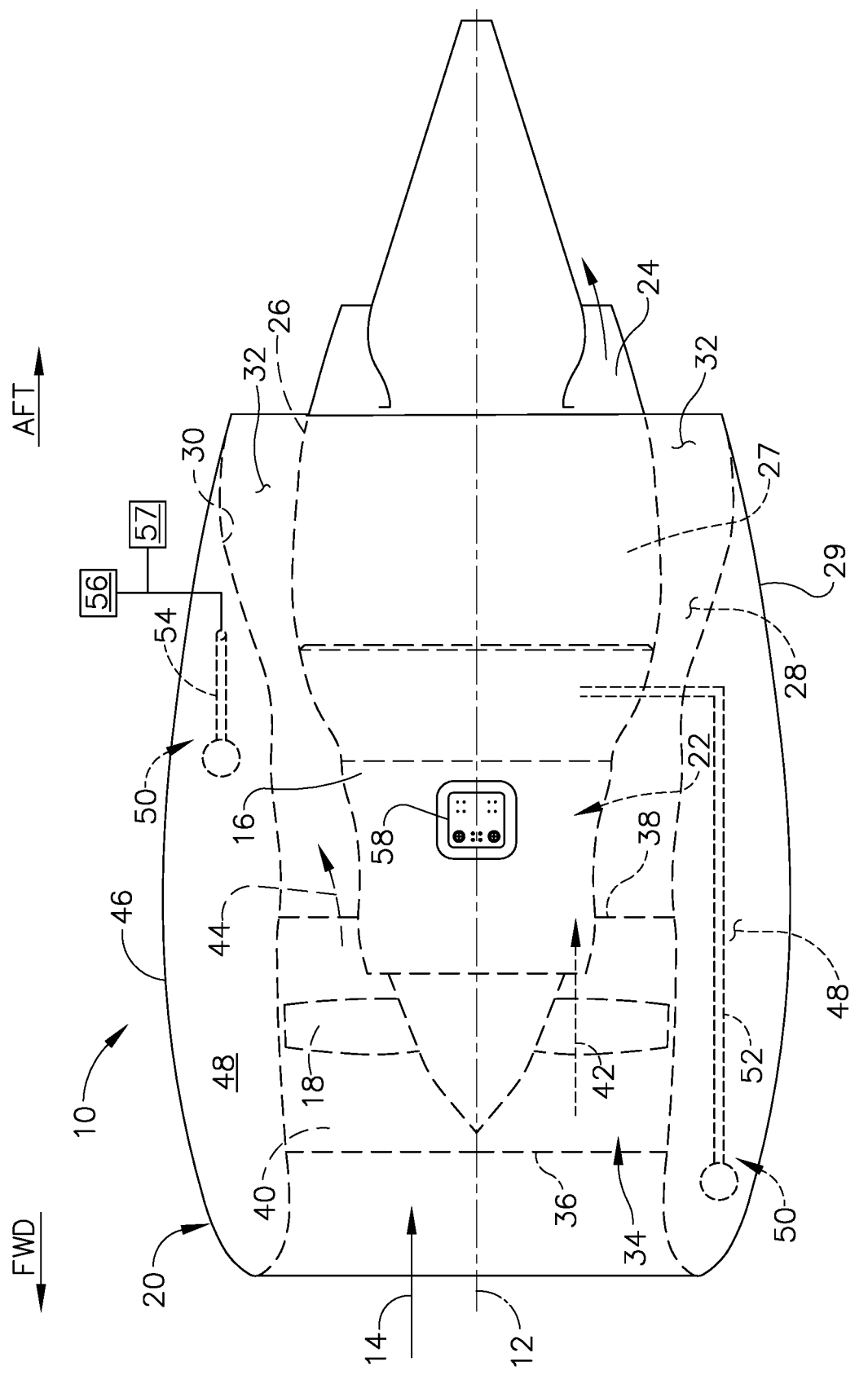
FIG. 1 is a schematic cross-sectional view of a turbine engine with a nacelle in accordance with various aspects described herein.

FIG. 1 illustrates an exemplary turbine engine assembly 10 having a longitudinal axis 12. A flow path 14 can be defined along the longitudinal axis 12. A turbine engine 16, a fan assembly 18, and a nacelle 20 can be included in the turbine engine assembly 10. The turbine engine 16 can include an engine core 22 with an exhaust 24. An inner cowl 26 radially surrounds the engine core 22 defining an inner housing 27.

An outer cowl 30 defines an outer housing 29 co-axial with the inner housing 27 spaced from the inner cowl 26 to define an interior 28 between the inner housing 27 and the outer housing 29. The interior 28 includes an annular passage 32 between the inner cowl 26 and the outer cowl 30. The annular passage 32 can be a bypass duct, permitting part of the airflow along the flow path 14 to bypass the engine core 22. The annular passage 32 characterizes, forms, or otherwise defines a nozzle and a generally forward-to-aft bypass airflow path.

An annular fan casing assembly 34 can include an annular forward casing 36 and an aft casing 38 with the annular fan casing assembly 34 having a peripheral wall 40 to form a portion of the outer cowl 30.

In operation, air flows through the fan assembly 18 along the flow path 14 and separates into a first portion 42 and a second portion 44 of air. The first portion of the airflow 42 is channeled through the engine core 22. The annular passage 32 is utilized to bypass the second portion of the airflow 44 discharged from the fan assembly 18 around engine core 22.

The outer cowl 30 further defines an annular chamber 48 radially outward of the annular passage 32. The annular chamber 48 provides a location for at least one duct system 50, by way of non-limiting example an anti-ice system 52 or a starter system 54. High pressure or high temperature gasses can be extracted from the engine core 22 or from another source, for example but not limited to an auxiliary power unit 56 or a ground supply 57, and provided to the duct systems 50.

An access door 58 can provide access through an opening to the interior 28 of the nacelle 20 in order to perform maintenance on engine components, by way of non-limiting example the oil tank (not shown) of the engine 16.

Figure 2:
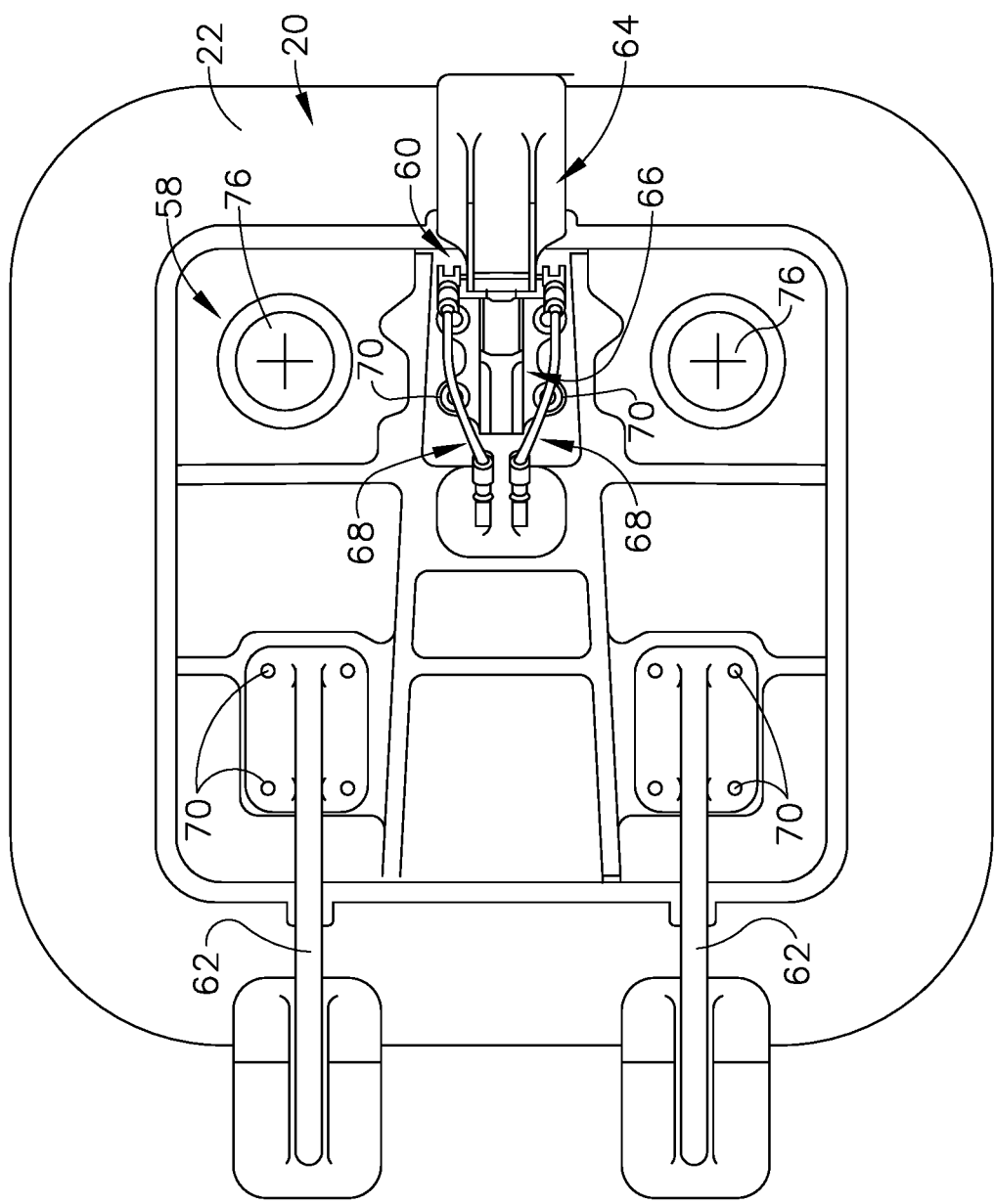
FIG. 2 is a bottom view of an access door with the door in a closed position in accordance with various aspects described herein.

FIG. 2 illustrates a bottom view of the access door 58, including a safety latch assembly 60, as seen from within the annular chamber 48. It should be understood that the access door 58 can be pivotally mounted to any suitable surrounding structure in any suitable manner including through use of hinges 62. For example, the access door 58 can be pivotally mounted to an outer surface 46 of the nacelle 20 as described herein. In such an instance the access door 58 can provide access to the oil tank and can be pivoted to a fully open position, such as 90 degrees or further, so that a user can have access to an the oil tank of the engine 16. The access door 58 can be pivotally mounted for pivotal movement between a closed position and an opened position (not shown) to provide selective access to the opening. It should be understood that the access door can also be slidably mounted and pivotal movement is not meant to be limiting.

The access door 58 can include a latch keep 64 that can form a portion of the safety latch assembly 60 and can be carried by one of the access door 58 and the outer surface 46.

In the illustrated example, the latch keep 64 is operably coupled with the outer surface 46.

A latch 66 can form another portion of the safety latch assembly 60 and can be carried by the other of the access door 58 and the surrounding structure 14. In the illustrated example, the latch 66 is carried by the access door 58.

A cable 68 can also be provided and secured to the other of the access door 58 and surrounding structure 14 and in the illustrated example, is coupled with the access door 58.

The hinges 62 and the safety latch assembly 60 can be secured to the access door 58 with any type of appropriate fastener 70 for example but not limited to a bolt and nut assembly.

The access door 58 includes a set of burst seals 76, which can be one burst seal 76. In the illustrated example, the set of burst seals 76 are provided on either side of the safety latch assembly 60. It should be understood that while illustrated on either side of the safety latch assembly 60, it can be contemplated that the burst seal 76 can be located on any portion of the access door 58 including in place of the safety latch assembly 60.

Figure 3:
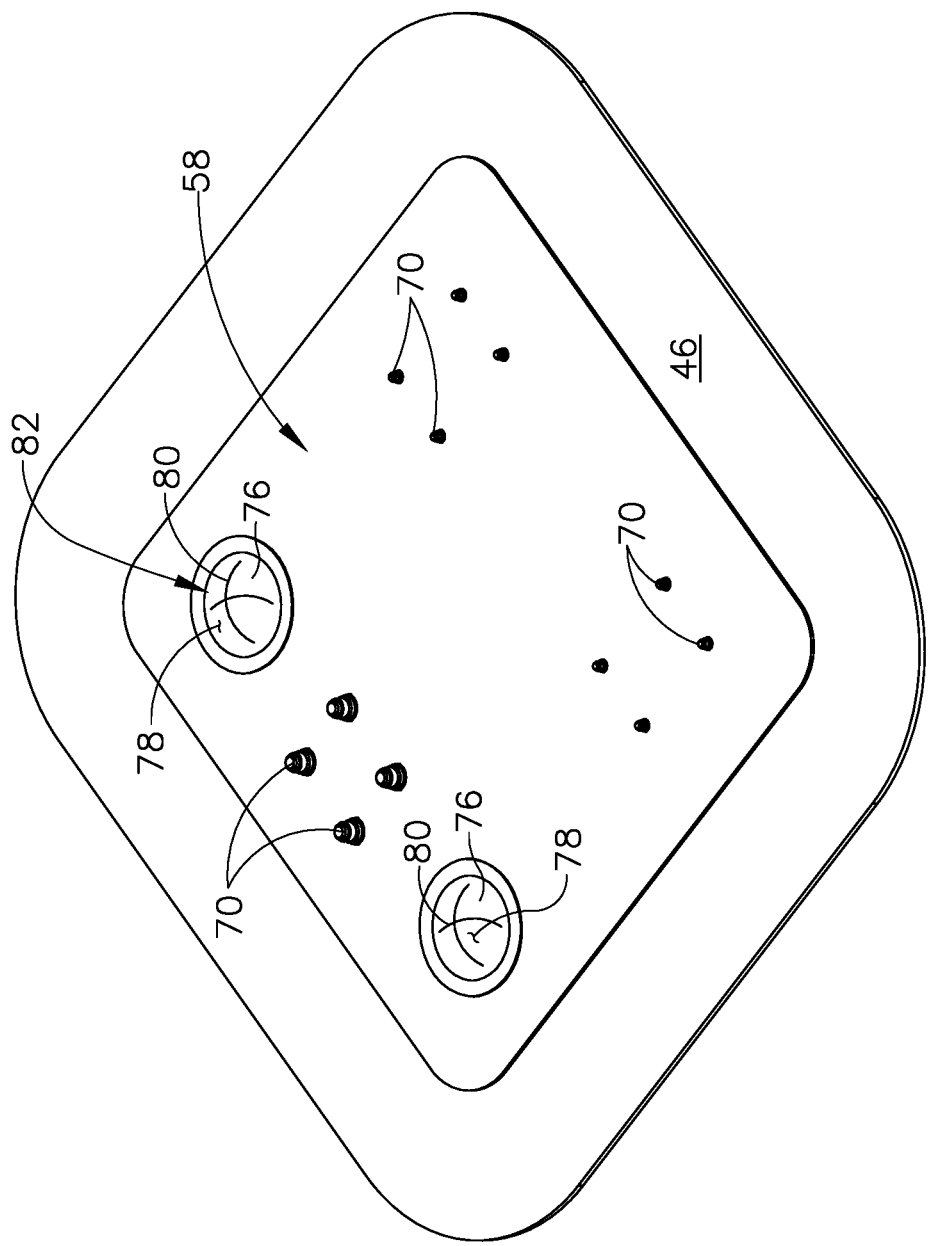
FIG. 3 is a perspective top view of the access door of FIG. 1 in accordance with various aspects described herein.

Turning to FIG. 3 a top perspective view of the access door 58 as seen from the outer surface 46 of the nacelle 20 is illustrated. Each burst seal 76 protrudes away from the outer surface 46 of the nacelle 20 forming a raised portion, such as dome 78, such that a concave surface faces the interior of the nacelle 20 and a convex surface defines the dome 78. A portion of the burst seal 76 includes a cross-score 80. The burst seal 76 can be made of a thin stainless steel plate where the cross is scored at the center during manufacturing.

Figure 4:
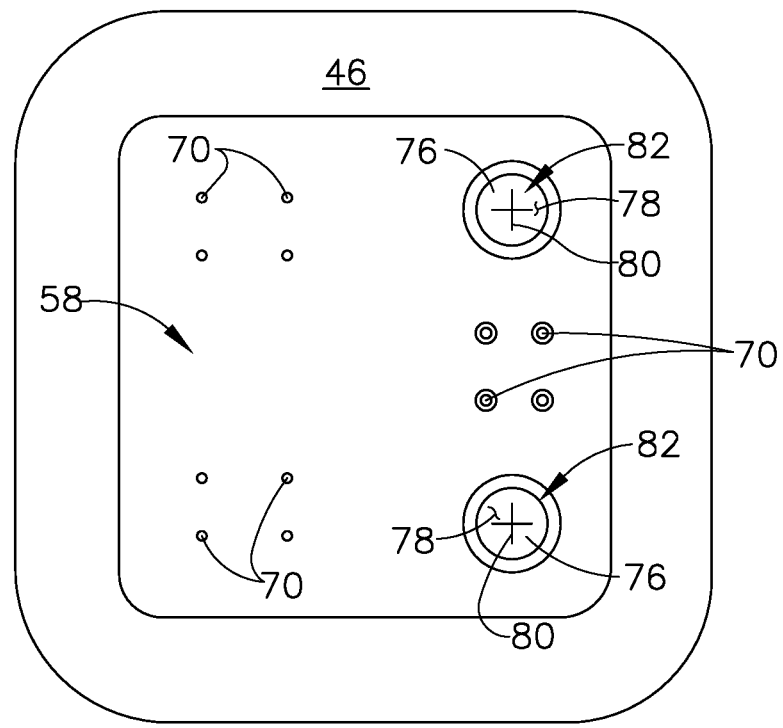
FIG. 4 is a top view of the access door of FIG. 1 with a rupture seal in a first position in accordance with various aspects described herein.

In FIG. 4 a top view of the access door 58 illustrates the burst seals 76 in a closed position 82. While the aircraft is grounded and during flight, the burst seals 76 will remain in this position under operating conditions.

Figure 5:
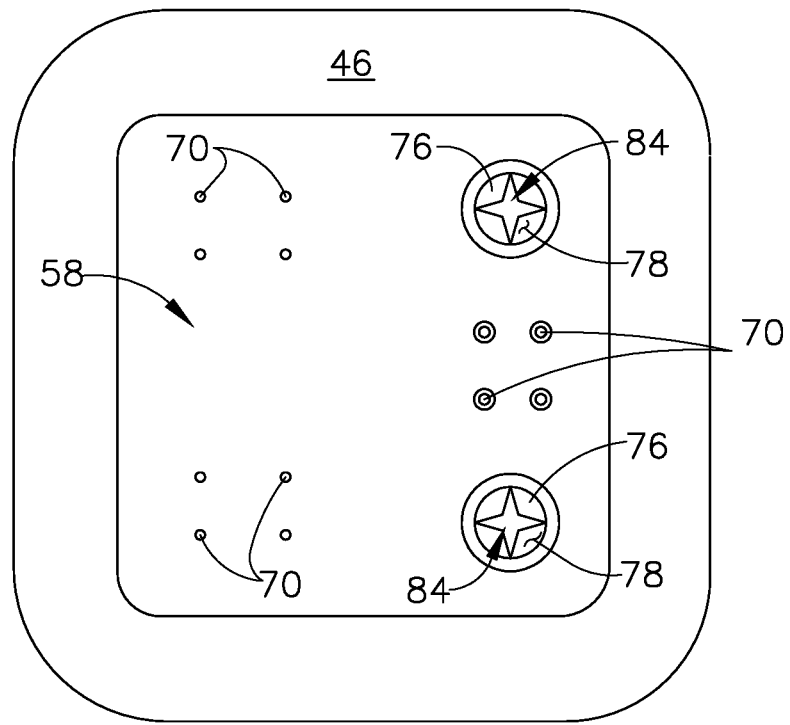
FIG. 5 is a top view of the access door of FIG. 1 with the rupture seal in a second position in accordance with various aspects described herein.

Turning to FIG. 5, the burst seals 76 are shown in an open or ruptured position 84. A method of relieving pressure in the interior comprises rupturing at least one of the burst seals 76 in the access door 58 without opening the access door 58 when the pressure in the interior reaches a predetermined value. The predetermined value of pressure is defined by the engine assembly 10 and in particular by the pressure at which the annular chamber 48 will become damaged by gas expansion. This predetermined value of differential pressure can vary from engine to engine, and typically is at least 3400 Pa (0.5 psig) or greater. By way of a non-limiting example, if pressure within the annular chamber of 0.6 psig causes damage to the nacelle 20, fan casing assembly 34, or outer cowl 30, a burst seal 76 designed to rupture at 0.6 psig would be installed in the access door 58.

It should be understood that any type of burst seal 76 designed to rupture at a specific pressure reading in the interior 28 of the nacelle 20 can be contemplated. By way of non-limiting example, rupture discs in particular have fixed pressures at which they will rupture. They are designed with a deviation derived from a material property from which they are made, however, the deviation, for example 0.6±0.003 psig, is relatively small. This specific rupture pressure and small deviation ensures the interior 28 of the nacelle 20 will remain undamaged, and that the burst seals 76 will only require replacement in the event that the interior 28 of the nacelle 20 could be damaged.

Figure 6A:
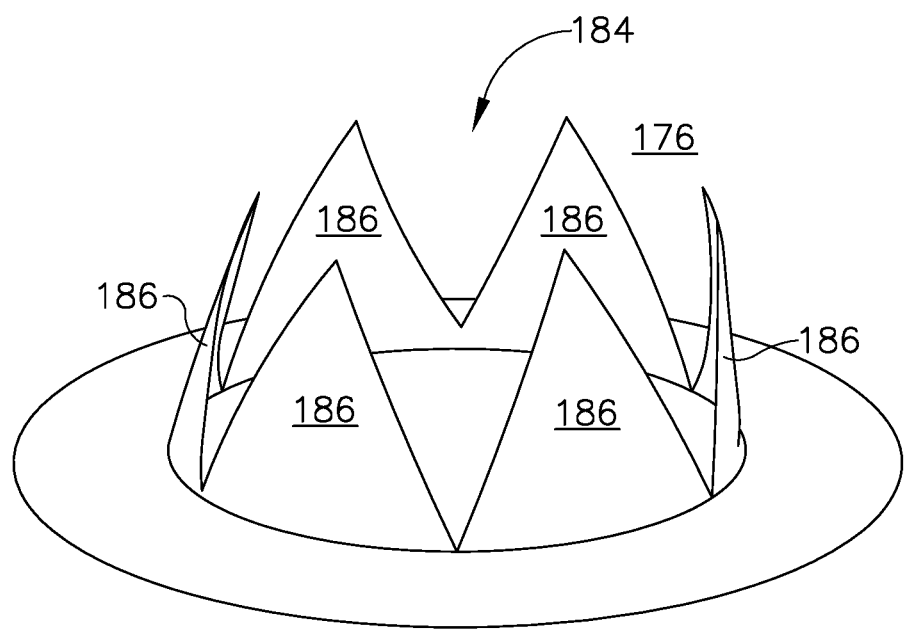
FIG. 6A and FIG. 6B are third and fourth embodiments of the rupture seal of FIG. 5 in accordance with various aspects described herein.
Figure 6B:
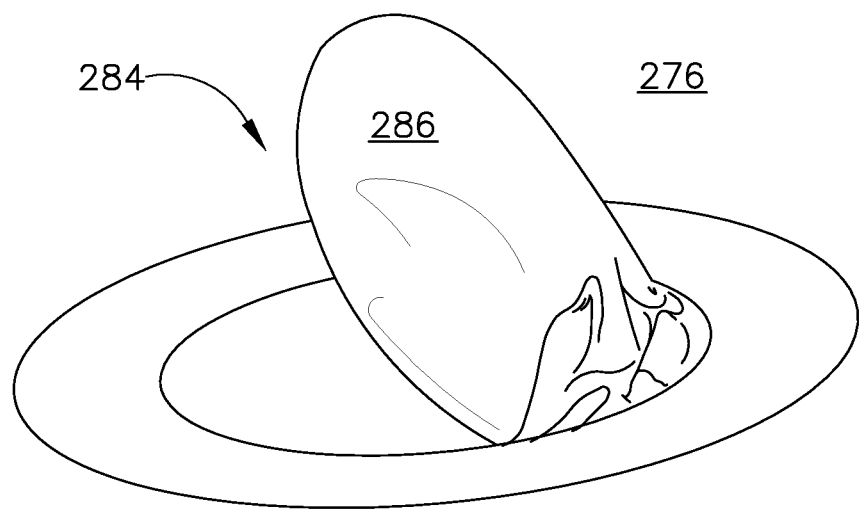

Other examples of the burst seal 76 are contemplated in FIGS. 6A and 6B. The additional examples are similar to the first embodiment, therefore like parts will be identified with like numerals increasing by 100, with it being understood that the description of the like parts of the burst seal 76 apply to the additional burst seals, unless otherwise noted.

Turning to FIG. 6A, a burst seal 176 having a score pattern of a star shape is contemplated. The burst seal 176 is shown in a ruptured position 184, where a plurality of metal petals 86 are formed when the burst seal 76 ruptures.

In FIG. 6B, another burst seal 276 with a circular score pattern is contemplated. When in the ruptured position 284 a single metal petal 286 is formed.

It should be understood that any number of score patterns can be contemplated and the cross-score, star pattern, and circular pattern are not meant to be limiting.

It is further contemplated that a burst seal 76 can be any mechanism designed for failure at a certain pressure and placed on an access door 58. The safety latch assembly 60 as described herein is used as a pressure release system in the prior art. By providing the access door 58 with a burst seal 76, the safety latch assembly 60 can be utilized to prevent the access door 58 from being opened through an overlarge angle and causing damage to the hinges 62. It is also contemplated that while two cables 68 are provided in the safety latch assembly 60, either the number of cables or the cable stiffness or a combination of both can be reduced.

Other benefits to providing a set of burst seals 76 on the access door 58 include preventing unwanted access door 58 openings during flight. All things being equal, a door should not be open on a contemporary aircraft in flight. In the conventional design of the safety latch assembly 60, the latch 66 was triggered by high pressure similar to the burst seals 76. However, vibrations within the engine 16 during operation could provide a false trigger to the latch 66 such that the access door 58 could open unnecessarily, for example at 0.5 psig regarding the example already discussed herein. The access door 58 could also open at too high of a pressure, for example 0.7 psig, after which damage to the interior 28 of the nacelle 20 could already happen. The burst seal 76 as described herein is attached to the access door 58 and minimally affected by vibrations within the engine.

Other non-limiting examples that can be contemplated include the door having its latch force increased to be greater than the force needed for the burst seal. Also, it can be contemplated that the burst seal can be resilient and close after bursting open.

To the extent not already described, the different features and structures of the various aspects can be used in combination with each other as desired. That one feature cannot be illustrated in all of the aspects is not meant to be construed that it cannot be, but is done for brevity of description. Thus, the various features of the different aspects can be mixed and matched as desired to form new examples, whether or not the new examples are expressly described. Moreover, while "a set of" various elements have been described, it will be understood that "a set" can include any number of the respective elements, including only one element. Combinations or permutations of features described herein are covered by this disclosure.

This written description uses examples to disclose the invention, including the best mode, and also to enable any person skilled in the art to practice the invention, including making and using any devices or systems and performing any incorporated methods. The patentable scope of the invention is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A gas turbine engine including:
    a core engine;
    a nacelle having co-axial inner and outer housings surrounding a fan and defining an interior between the inner and outer housings with an opening;
    an access door for the opening and movably mounted to a portion of the nacelle to provide selective access to the opening; and
    a set of burst seals provided on the access door; wherein
        when pressure within the interior reaches a predetermined value the set of burst seals moves between a closed position and a ruptured position forming at least one petal that remains connected to the access door while the access door remains in a closed position.

2. The gas turbine engine of claim 1 wherein the interior includes an annular chamber providing a location for at least one duct system.

3. The gas turbine engine of claim 2 wherein the duct system is an anti-ice system.

4. The gas turbine engine of claim 2 wherein the duct system is a starter system.

5. The gas turbine engine of claim 1 wherein the access door includes a safety latch assembly.

6. The gas turbine engine of claim 1 wherein the access door is pivotally mounted to an outer surface of the outer housing.

7. The gas turbine engine of claim 1 wherein the set of burst seals is a rupture disc.

8. The gas turbine engine of claim 1 wherein the set of burst seals is scored.

9. The gas turbine engine of claim 1 wherein the set of burst seals is a plurality of burst seals.

10. The gas turbine engine of claim 1 wherein the predetermined value is between 3400 Pa or 0.5 psi and 4200 Pa or 0.6 psi.

11. A nacelle for a turbine engine including:
    co-axial inner and outer housings surrounding a fan and defining an interior between the inner and outer housings;
    an access door pivotally mounted to the outer housing providing access to the interior; and
    a set of burst seals made of a resilient material provided on a surface of the access door; wherein
        the set of burst seals moves between a closed position and a ruptured position at a predetermined pressure value forming at least one petal that can close after bursting open while the access door remains in a closed position.

12. The nacelle of claim 11 wherein the interior includes an annular chamber providing a location for at least one duct system.

13. The nacelle of claim 11 wherein the access door is pivotally mounted to an outer surface of the outer housing.

14. The nacelle of claim 11 wherein the set of burst seals is a rupture disc.

15. The nacelle of claim 11 wherein the set of burst seals is scored.

16. The nacelle of claim 11 wherein the set of burst seals is a plurality of burst seals.

17. The nacelle of claim 11 wherein the predetermined value is between 3400 Pa or 0.5 psi and 4200 Pa or 0.6 psi.

18. A method of relieving pressure in an interior of a nacelle having co-axial inner and outer housings surrounding a fan and defining the interior between the inner and outer housings, and an access door to the interior, the method comprising:
    rupturing a set of burst seals in the access door without opening the access door when the pressure in the interior reaches a predetermined level, wherein
        the ruptured set of burst seals moves between a closed position and a ruptured position to form at least one petal that is resilient and closes after bursting open.

19. The method of claim 18 wherein the rupturing the set of burst seals comprises breaking the set of burst seals when the predetermined level is between 3400 Pa or 0.5 psi and 4200 Pa or 0.6 psi.

20. The method of claim 18 wherein the rupturing the set of burst seals comprises breaking the set of burst seals along a score pattern on the burst seal.

* * * * *